(12) United States Patent
Agulnik et al.

(10) Patent No.: US 8,194,629 B2
(45) Date of Patent: Jun. 5, 2012

(54) METHOD FOR DISTRIBUTING MEDIA IN AN INFRASTRUCTURE BASED COMMUNICATION SYSTEM

(75) Inventors: Anatoly Agulnik, Deerfield, IL (US);
Thomas M. Tirpak, Glenview, IL (US);
Hang Xie, Lake Zurich, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 897 days.

(21) Appl. No.: 12/177,568

(22) Filed: Jul. 22, 2008

(65) Prior Publication Data

US 2010/0020745 A1    Jan. 28, 2010

(51) Int. Cl.
*H04L 12/28* (2006.01)
(52) U.S. Cl. ........................................................ 370/338
(58) Field of Classification Search .................. 370/315, 370/328
See application file for complete search history.

(56) References Cited

U.S. PATENT DOCUMENTS

| | | | | |
|---|---|---|---|---|
| 6,879,574 | B2 * | 4/2005 | Naghian et al. | 370/338 |
| 6,904,452 | B2 | 6/2005 | Sedky | |
| 7,133,922 | B1 | 11/2006 | She | |
| 7,394,798 | B2 * | 7/2008 | Naghian | 370/338 |
| 2003/0158958 | A1 | 8/2003 | Chiu | |
| 2005/0086329 | A1 * | 4/2005 | Datta et al. | 709/220 |
| 2006/0026088 | A1 | 2/2006 | Grossman | |
| 2006/0184968 | A1 | 8/2006 | Clayton | |
| 2007/0127421 | A1 | 6/2007 | D'Amico | |

FOREIGN PATENT DOCUMENTS

| KR | 1020020083604 A1 | 4/2002 |
|---|---|---|
| KR | 1020050121038 A | 12/2005 |

OTHER PUBLICATIONS

PCT International Search Report Dated Feb. 24, 2010.
Padmanabhan, et al. "Distributing Streaming Media Content Using Cooperative Networking", NOSSDAV '02, May 12-14, 2002, Miami, FL, USA.

* cited by examiner

*Primary Examiner* — Huy D Vu
*Assistant Examiner* — Alan Lindenbaum
(74) *Attorney, Agent, or Firm* — Valerie M. Davis; Randi L. Karpinia

(57) ABSTRACT

A wireless communication device acquires membership in a predefined group, joins an ad hoc network associated with the predefined group, and joins and participates in a first session established through an infrastructure device for distributing media to the predefined group. If the wireless communication device is a duplicator node for the ad hoc network, then it receives the media from the infrastructure device and distributes the media other nodes of the ad hoc network, otherwise it receives the media from the duplicator node. The infrastructure device identifies the duplicator node for each ad hoc network associated with the predefined group and each member of the predefined group that is not a node of any of the ad hoc networks and distributes the media only to these members of the predefined group.

4 Claims, 6 Drawing Sheets

| PREDEFINED GROUP ID | DUPLICATOR NODE ID |
|---|---|
| 1004 | 348 |
| 1034 | |
| 1010 | 456 |
| 1600 | 546 |

| PREDEFINED GROUP ID | WIRELESS COMMUNICATION DEVICE ID | DUPLICATOR NODE ID | TRANSMIT DATA |
|---|---|---|---|
| 1004 | 348 | 348 | Y |
| 1004 | 350 |  | Y |
| 1004 | 352 | 348 | N |
| 1004 | 354 | 348 | N |

*FIG. 6*

METHOD FOR DISTRIBUTING MEDIA IN AN INFRASTRUCTURE BASED COMMUNICATION SYSTEM

FIELD OF THE DISCLOSURE

The present disclosure relates generally to an infrastructure-based communication system and more particularly to the field of distributing media in an infrastructure-based communication system.

BACKGROUND

A feature offered within infrastructure-based communications systems is group communication. Traditionally, group communication was mainly available within Professional Radio or Private Mobile Radio (PMR) systems, such as TETRA (TErrestrial Trunked RAdio), many of which were designed for professional and governmental users, such as personnel from police, military forces, oil plants, and the like.

Group communication with a "push-to-talk, release-to-listen" (PTT) feature is another widely used feature in PMR systems. Generally, in group voice communication with a PTT feature, a group call is based on the use of a pressel (or push-to-talk button) as a switch on a subscriber unit. By pressing the pressel, the user indicates his/her desire to speak to a specific subscriber group, and the subscriber equipment sends a service request to a corresponding communication network. The communication network either rejects the request or allocates the requested resources on the basis of predetermined criteria, such as availability of resources, priority of the requesting user, etc. At the same time, a connection is also established with other users in the subscriber group. After a voice connection is established, the requesting user can talk, and the other users can listen on the channel or vice versa.

Group communication both with and without the PTT feature is becoming readily available in public infrastructure-based communications systems, and a demand for such services continues to increase. Further, group communication is no longer limited to voice communication but has also been extended to sharing other media. However, during a multimedia group call, the existing infrastructure-based communication systems use centralized equipment such as a centralized controller to distribute the media to each of the intended receivers.

Such distribution of media for a group call can require a significantly high amount of radio frequency resources, essentially becoming a limiting factor in the number of participants in a communication group. This extensive use of the radio frequency resources for distributing the media by the controller increases the probability of failures in the media transfer for a variety of reasons such as network congestion, malfunctioning of the source and destination hardware and/or software, etc. This problem is much more prominent when the group members are present in a close geographical proximity. Accordingly, there is a need for an improved method for distributing media in an infrastructure-based communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6 is an association table maintained at an infrastructure device in accordance with some embodiments.

Figure 1:
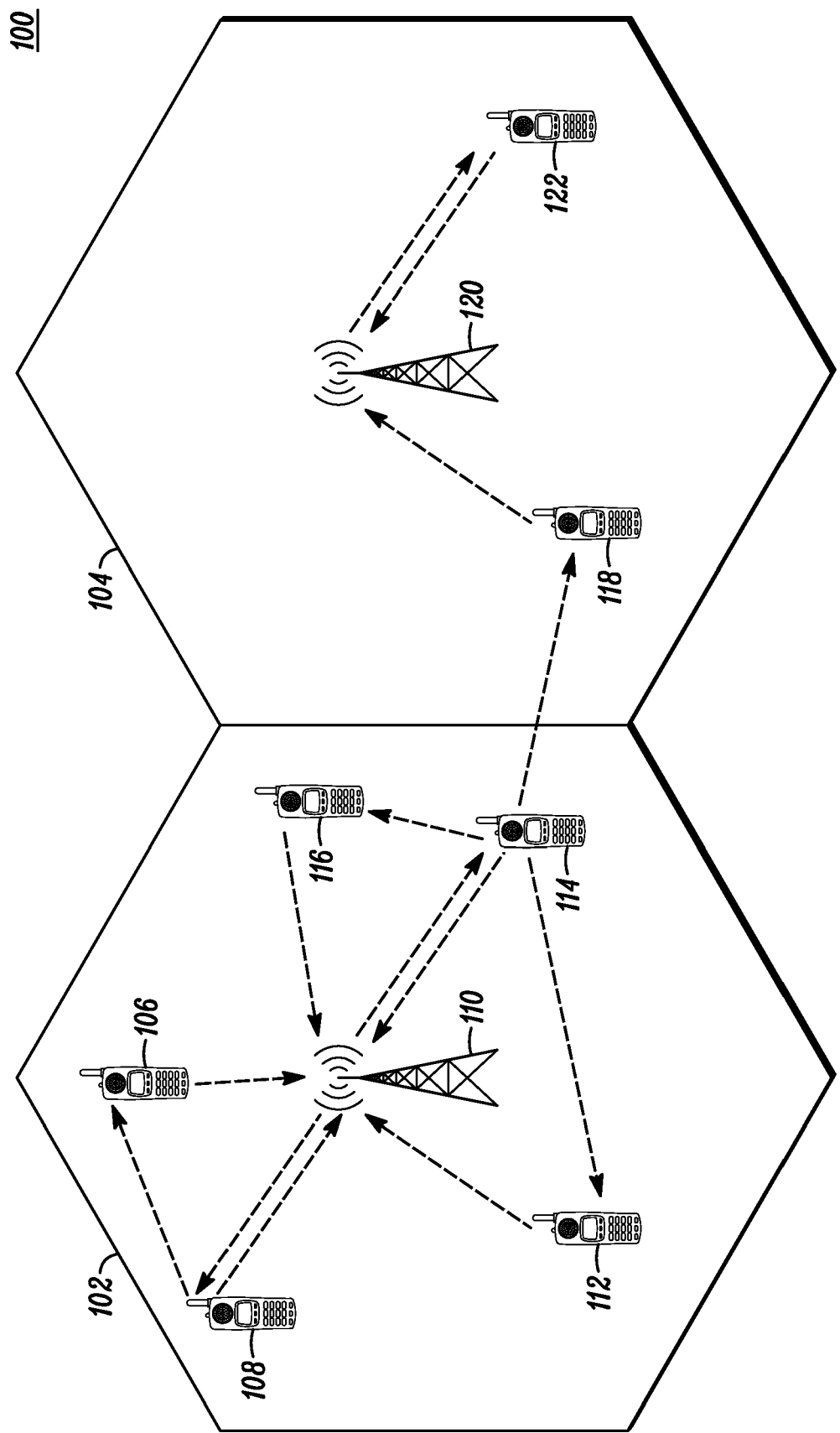
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments. In addition, the description and drawings do not necessarily require the order illustrated.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, methods are described for distributing media in an infrastructure-based communication system. The infrastructure-based communication system includes at least one infrastructure device and a plurality of wireless communication devices, wherein at least some of the wireless communication devices are members of a predefined group where distribution of media within the predefined group is managed by an infrastructure device. The predefined group is further associated with one or more dynamically formed ad hoc networks, with each ad hoc network being formed by and between a different subset of the members of the predefined group, with one wireless communication device of each subset being selected as a duplicator node for the corresponding ad hoc network to receive and distribute media to other nodes of the ad hoc network.

Members of the predefined group and nodes of the associated ad hoc networks can be adapted, arranged, configured, or designed to participate in a session for distributing media to the predefined group. Further, when a wireless communication device is a duplicator node for an ad hoc network, then it receives the media from the infrastructure device and distributes the media to the other nodes of the ad hoc network, otherwise the wireless communication device receives the media from the duplicator node, in accordance with the teachings herein.

Each infrastructure device in the communication system can be adapted, arranged, configured, or designed to establish a session for the predefined group. The infrastructure device further identifies the duplicator nodes for each ad hoc network and each member of the predefined group that is not a node of any of the ad hoc networks; and distributes media for the session to only the members of the predefined group that are not a node of any of the ad hoc networks and to the duplicator nodes for distributing the media to the remaining members of the predefined group that have joined the session, in accordance with the teachings herein. Since the infrastructure device to sends the media to only the duplicator node of a given ad hoc network instead of all the session participants that belong to the ad hoc network, at least some of the following benefits can be provided in a system implementing embodiments of the teachings herein: the reduction of the required bandwidth resources for unicast over the air scenarios; the reduction of the required bandwidth resources by switching from multicast over the air to a single individual media downstream; the reduction of the number of sites involved in the media distribution (when the ad hoc network nodes are connected to different infrastructure sites; the increase in voice quality or bit rate transmission due to better RF connection between the infrastructure and the duplicator node (comparing to connection quality with other participants); and enabling easily synchronized audio from device speakers of co-located participants of the same session (provided they belong to the same ad hoc network). These are only an illustrative list of possible benefits and not meant to represent an exhaustive list of such benefits and is in no way meant to limit the scope of the teachings herein.

Referring now to the figures, FIG. 1 is a system diagram illustrating an infrastructure-based communication system 100 in accordance with some embodiments. At present, standards bodies such as OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum are developing standards specifications for infrastructure-based communication systems. The teachings herein may be implemented in communication systems that employ technologies including, but not limited to, those described in the OMA, WiMAX Forum, IEEE 802, and/or 3GPP2 specifications.

As used herein, an "infrastructure-based communication system" is a communication system that includes one or more infrastructure devices that communicate with wireless communication devices in the system to manage media distribution between the wireless communication devices. Infrastructure-based communication systems can be contrasted with "ad hoc networks", which as the term is used herein, describes decentralized networks dynamically formed by and between wireless communication devices (i.e., there are no infrastructure devices included in or used to distribute media within the ad hoc network), wherein each device in the ad hoc network can forward data to other devices in the ad hoc network, and the determination of which device(s) forward data is also made dynamically based on one or more factors.

Communication system 100 is depicted in a very generalized manner. For example, system 100 is shown to simply include two wireless coverage areas 102 and 104 for ease of illustration. The wireless coverage area 102 comprises wireless communication devices 106, 108, 112, 114, 116 and an infrastructure device 110. The wireless coverage area 104 comprises wireless communication devices 118, 122 and an infrastructure device 120. The infrastructure devices are shown providing network services to wireless communication devices using wireless interfaces (illustrated by dashed lines). The wireless interfaces are in accordance with the particular access technology supported by the infrastructure devices 110, 120 respectively. For example, they may all utilize the same technology such as one based on Push-to-talk over cellular (PoC), or they may utilize different access technologies. Moreover, each wireless communication device includes the capability to communicate with the infrastructure devices 110, 120 through one or more wireless communication protocols such as Advanced Mobile Phone System (AMPS), Code division multiple access (CDMA), Time division multiple access (TDMA), Global System for Mobile communications (GSM), Integrated Digital Enhanced Network (iDEN), General Packet Radio Service (GPRS), Enhanced Data rates for GSM Evolution (EDGE), Universal Mobile Telecommunications System (UMTS), Wideband Code Division Multiple Access (WCDMA), Code division multiple access 2000 (CDMA2000), and their variants. The wireless communication devices also use ad-hoc communication to connect directly to each other and execute applications that utilize the ad-hoc connection.

The infrastructure devices and wireless communication devices are equipped with transceivers, memories and processing devices operatively coupled and adapted, arranged, configured and designed to carry out their functionality, including any functionality needed to implement the teachings herein. The infrastructure devices and wireless communication devices are further equipped with any other elements needed for a commercial embodiment.

As used herein, an infrastructure device is a device that is a part of a fixed network infrastructure and can receive information (either control or media, e.g., data, voice (audio), video, etc.) in a signal from a wireless communication device and transmit information in signals to one or more wireless communication devices via a communication link. In general, communication links (also referred to herein as channels) comprise the physical communication resources (e.g., radio frequency (RF) resources) over which information is sent between the elements within system 100. Communication links can be wireless or wired. For example, as illustrated in FIG. 1, infrastructure devices 110 and 120 communicate with the wireless communication devices, and the wireless communication devices communicate with each other via wireless links. Illustrated as communication links are: dashed lines leading from an infrastructure device and terminating in an arrow at a wireless communication device, thereby indicating a downlink channel with transmissions flowing in the direction of the arrow; dashed lines leading from a wireless communication device and terminating in an arrow at an infrastructure device, thereby indicating an uplink channel with transmissions flowing in the direction of the arrow; and channels between the wireless communication devices. The wireless communication devices can use standard uplink and downlink channels for control signaling such as, for instance, registration, re-registration, session set-up and termination and floor control. The wireless communication devices can also use a standard uplink channel to source media to the infrastructure device. However, downlink channel distribution is enhanced using the teachings herein. The infrastructure devices are usually coupled together via wired links (not shown) and can be coupled via various other network elements such as base station controllers (also not shown).

An infrastructure device includes, but is not limited to, equipment commonly referred to as application servers, PTT servers, base stations, base transceiver stations, access points, routers or any other type of infrastructure equipment interfacing a wireless communication device in a wireless environment. As referred to herein, a wireless communication device includes, but is not limited to, devices commonly referred to as access terminals, mobile radios, mobile stations, subscriber units, user equipment, mobile devices, or any other device capable of operating in a wireless environment. Examples of wireless communication devices include, but are not limited to, two-way radios, mobile phones, cellular phones, Personal Digital Assistants (PDAs), laptops and pagers.

Only a limited number of coverage areas, infrastructure devices and wireless communication devices are shown for ease of illustration. However, system 100 can comprise any number of coverage areas, which each including at least one infrastructure device that supports any number of wireless communication devices, based on system requirements. Moreover, embodiments are not dependent on the applications and protocol(s) running on the devices in the system and used to facilitate communications in the system but can be used with any such applications and protocols.

For example, in this illustrative embodiment the infrastructure devices and the wireless communication devices can implement PTT technology, which can, for instance, be based on 2.5G or 3G technologies. PTT can be used to create two-party, multiparty (group), or multicast sessions that include simple file transfers, Internet telephone calls, multimedia distribution, and multimedia conferences. One particular version of PTT is called Push to Talk over Cellular, which is abbreviated as PoC. One such example of PoC is described in a document published by Open Media Alliance and titled "Push to talk over Cellular 2" (Candidate Version 2.0—Oct. 2, 2007), including previous and subsequent revisions. Moreover, the PTT technology can be implemented in conjunction with an "application-layer protocol" that works in the application layer of the Open Systems Interconnection (OSI) communication model to provide services to an application running on a device. Examples of application-layer protocols that can be used with PTT are Session Initiation Protocol (SIP) as specified in Internet Engineering Task Force (IETF) Request for Comments (RFC) 3261 (Rosenberg, et al. 2002, including previous and subsequent revisions) and Real-time Transport Protocol (RTP) as specified in IETF RFCs 3550, 3551 and 3711 (respectively, Schulzrinne, et al. July 2003, Schulzrinne, et al. July 2003, and Baugher, et al. March 2004, with each RFC including previous and subsequent revisions), for creating, modifying and terminating sessions with one or more wireless communication devices.

The wireless communication devices 106, 108, 112, 114, 116, 118, 122 are members of a predefined group, which is formed with the assistance of one or more infrastructure devices so that the infrastructure devices can be used to control and manage the transfer of media between the wireless communication devices. For example, in one embodiment each wireless communication device registers with the infrastructure device in the coverage area in which the wireless communication device is currently located to become members of the predefined group. The wireless communication devices can, for instance, register using a SIP REGISTER message, although other registration techniques may be used without departing from the scope of the disclosure herein. To further facilitate communications within system 100, each wireless communication device can send additional registration details to its respective infrastructure device that may include, but are not limited to, an identifier, resource capabilities (e.g., audio, video, data capabilities, etc.), bit rates supported, resource priority level, and power levels for the wireless communication device. Other methods of acquiring membership in a predefined group include, but are not limited to, the wireless communication device being provisioned as a member, or using some sort of affiliation technique to acquire membership.

In addition, in this illustrative embodiment, after each wireless communication device acquires membership in a predefined group, the wireless communication devices continuously search for other wireless communication devices that are members of the same predefined group to dynamically form ad hoc networks with the detected wireless communication devices. The criteria that the wireless communication devices use to form the ad hoc networks can vary depending on the ad hoc technology and protocol used. However, in an embodiment such criteria may include, for example, a geographical proximity of the devices to one another and whether the devices can "hear" or detect transmissions from one another. The ad hoc networks are dynamic in that its nodes may change over time based on a change in the one or more criteria used to form the ad hoc network. Likewise, the number of ad hoc networks associated with a given predefined group may increase or decrease over time depending on these same criteria.

The wireless communication devices that are nodes of a given ad hoc network negotiate to select a duplicator node for the ad hoc network. During a session that has been established to distribute media to members of the predefined group, the duplicator node is the only node in a given ad hoc network that receives media directly from the infrastructure device to which it is connected. The duplicator node distributes or duplicates that media to all of the other nodes of its ad hoc network. Accordingly, although the other nodes of the ad hoc network remain connected to their respective infrastructure devices (e.g., for control signaling and uplink media), they do not receive the media directly from the infrastructure device; instead they receive it from a duplicator node.

In an embodiment, the selection of the duplicator node is based on a plurality of duplicator selection parameters such as, for instance: bit rates used by the wireless communication devices to receive and transmit media in the system (a higher bit rate may in some instances be a desirable feature for selecting a duplicator node); resource priority level; remaining battery power level; power level needed by the infrastructure device to transmit to the wireless communication device; capabilities of the wireless communication device; quality of the connection between the wireless communication device and its respective infrastructure device; current speed of the wireless communication device (which may indicate a length of time the device might remain a member of the ad hoc network), etc. A benefit of ad hoc networking is that no infrastructure device is needed or used to select the nodes of the ad hoc network or the duplicator node for the ad hoc network, thereby conserving the RF resources and the other resources (e.g., processing power, memory, etc.) of the infrastructure devices. In this sense, the ad hoc networks are formed solely by and between the wireless communication devices.

As the duplicator selection parameters change over time, a different duplicator node can be selected for the ad hoc network. For instance, a first wireless communication device may be selected as the duplicator node for a first time interval based on the status of the duplicator selection parameters at the start of the first time interval. However, during a subsequent time interval, a different wireless communication device may be selected as the duplicator node for the ad hoc network based on a change in the duplicator selector parameters. In addition, it is possible that not all of the wireless communication devices are nodes of an ad hoc network during certain time periods. These wireless communication devices are also referred to as "stand-alone" devices. Stand-alone devices would simply receive media directly from the infrastructure device to which they are connected during a session. Moreover, for ease of illustration, only one duplicator node is depicted as being selected for a given ad hoc network. However, a plurality of duplicator nodes may be selected for the ad hoc network depending, for instance, on the size of the ad hoc network or the media type being distributed within an active session for the predefined group.

As depicted in FIG. 1, wireless communication devices 108 and 106 form a first ad hoc network, with device 108 being selected as the duplicator node for the first ad hoc network. Wireless communication devices 112, 114, 116, and 118 form a second ad hoc network, with the wireless communication device 114 being selected as the duplicator node for the second ad hoc network. In this example, wireless communication device 122 is a stand-alone device. Accordingly, during a session for distributing media to the members of the predefined group, the duplicator nodes 108 and 114 and the wireless communication device 122, receive the media directly from an infrastructure device. The wireless communication device 106 receives the media from the duplicator node 108, and the wireless communication devices 112, 116, 118 receive the media from the duplicator node 114. In this scenario, RF resources of the infrastructure device 110 are conserved when media is distributed to the members of the predefined group since device 110 only sends the media to two wireless communication devices (108 and 114) instead of five such devices (108, 114, 106, 112 and 116). The duplicator nodes of the ad hoc networks can be configured to determine whether to transmit the media to the wireless communication devices of their respective ad hoc networks using unicast or multicast/broadcast protocols depending on, for instance, the number of devices that will be receiving the media.

Figure 2:
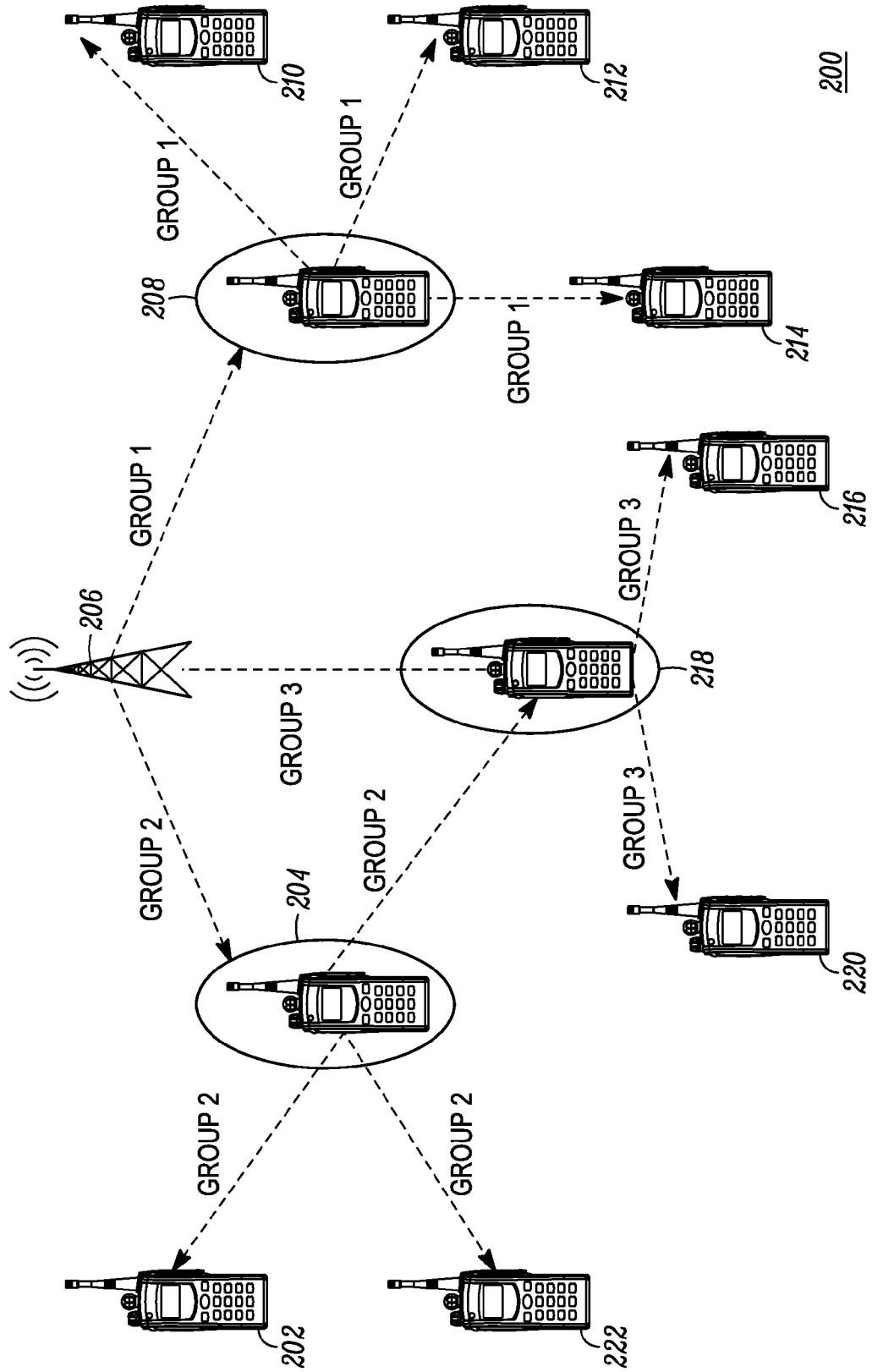
FIG. 2 is a block diagram of a communication system in accordance with some embodiments.

As can be seen from FIG. 1, a plurality of duplicator nodes (e.g., 108, 114) can be used in a single coverage area (e.g., 102) for the same predefined group. Also, wireless communication devices connected to different infrastructure devices (e.g., 110, 120) can be nodes of the same ad hoc group and, thereby, associated with the same duplicator node. In this scenario, a benefit is that RF resources of the infrastructure device 120 are conserved when media is distributed to the second ad hoc network because device 120 sends the media to only one wireless communication device instead of two wireless communication devices. In addition, a wireless communication device might become a member of more than one predefined group and join and become a node in one or more ad hoc networks associated with the additional predefined group(s). In that scenario, it is conceivable that the wireless communication device could be associated with different duplicators nodes for different ad hoc networks and/or could be the duplicator node of none or any number of the ad hoc networks in which it is a node. FIG. 2 illustrates such an implementation scenario.

FIG. 2 is a block diagram of a portion of an infrastructure-based communication system 200 in accordance with some embodiments. System 200 comprises a plurality of wireless communication devices 202, 204, 208, 210, 212, 214, 216, 218, 220 and 222 that have formed three ad hoc networks, which are associated with three different predefined groups. System 200 further comprises an infrastructure device 206 that manages distribution of media to the members of the predefined groups. As illustrated, devices 208, 210, 212 and 214 are nodes of a first ad hoc network associated with a first predefined group 1, with device 208 being the selected duplicator node. Devices 202, 204, 218 and 222 are nodes of a second ad hoc network associated with a second predefined group 2, with device 204 being the selected duplicator node. Devices 216, 218 and 220 are nodes of a third ad hoc network associated with a third predefined group 3, with device 218 being the selected duplicator node. As can be seen in this illustrative implementation, wireless communication device 218 is node of multiple ad hoc networks (i.e., the second and third ad hoc networks). Moreover, device 218 is the duplicator node for the third ad hoc network but receives media for a session from the duplicator node of the second ad hoc network To assist the wireless communication devices in managing their memberships in various predefined groups and associated ad hoc networks these devices store information that they can readily access. Such information could include, for example, a group identification (ID) corresponding to each predefined group of which the wireless communication device is a member, whether the device has joined an ad hoc network for a given predefined group, and an associated duplicator node ID for a given ad hoc network. Such information can be stored in any suitable storage device either integrated within the housing of the device (e.g., a Random Access Memory) or in a separate physical device to which the wireless communication device has access. Moreover, such information may be maintained in any number of forms such as, but not limited to, a database of associations.

Figures 3, 4:
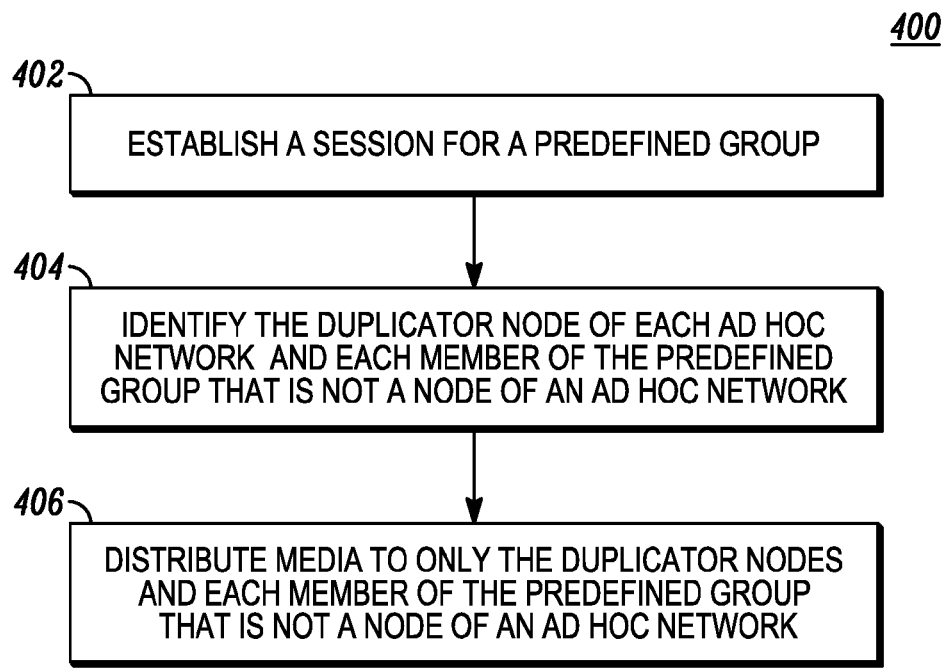
FIG. 3 is an association table maintained at a wireless communication device in accordance with some embodiments.
FIG. 4 is a flowchart of a method of operation in an infrastructure device in accordance with some embodiments.

FIG. 3 illustrates an example database of associations 300 for one wireless communication device, which includes an association between multiple predefined groups and an identity of a duplicator node for an associated ad hoc network if one exists. The database 300 includes in a predefined group ID field 302 a list of predefined group IDs (1004, 1034, 1010, and 1600) for four different predefined groups of which the device is a member. The database 300 further includes in a duplicator node ID field 304 an ID (348, 456, 546) for the duplicator node for each ad hoc network to which the wireless communication device belongs. In this case, the device is a node of an associated ad hoc network for three (1004, 1010 and 1600) of the four predefined groups. A non-associated status is indicated for predefined group ID 1034. In addition, although not shown in FIG. 3, if the wireless communication device is a duplicator node it also maintains a list of all other nodes for which it serves as a duplicator.

Turning again momentarily to stand-alone device 122 shown in FIG. 1, at some later time during the active group session this device may form an ad hoc network with one or more of the other wireless communication devices 106, 108, 112, 114, 116 and 118 due to changing conditions in the system and/or locations of the devices, or device 122 may join the existing first or second ad hoc network. In that case, device 122, via some type of update message (for instance a SIP UPDATE), notifies the infrastructure device distributing the media for the predefined group of its change in status and further notifies the infrastructure device of the identity of the duplicator node for the ad hoc network that it just joined. This causes the infrastructure device to discontinue sending the media directly to device 122 (e.g., remove device 122 from its distribution list). Device 122 will receive the media via the duplicator node to which device 122 is now associated.

Likewise, a wireless communication device may leave an ad hoc network and not join another ad hoc network associated with another duplicator node. In this case, the device notifies (e.g., using an update message) the infrastructure device distributing media for the predefined group of its stand-alone status. In an embodiment, the infrastructure device adds this device to its distribution list and, thereafter, sends the media directly to the device without going through a duplicator node. It should be realized that the infrastructure device (e.g., an application server) could "directly" send media to a wireless communication device through another infrastructure device (e.g., base stations) but not through another wireless communication device.

Figure 7:
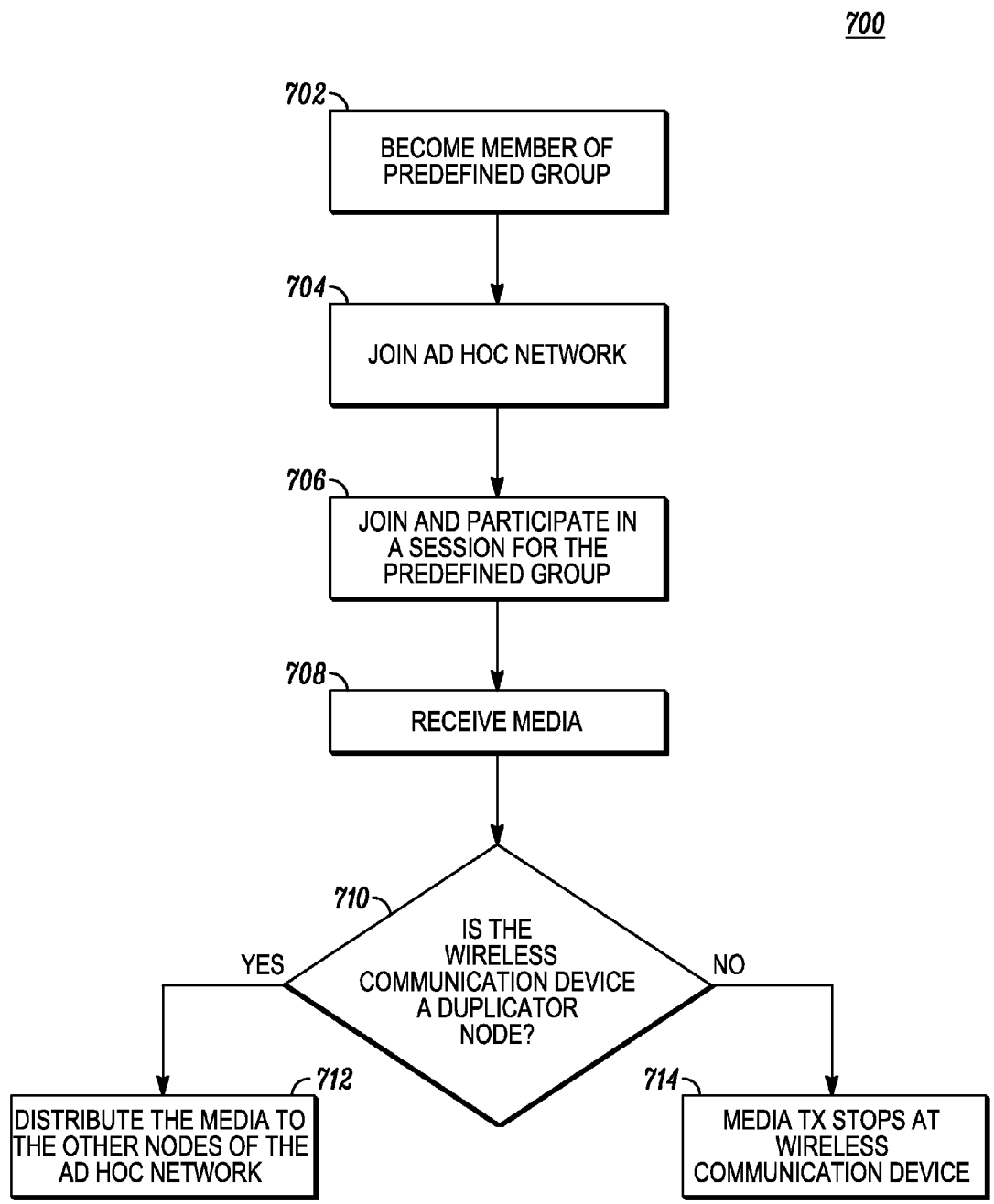
FIG. 7 is a flowchart of a method of operation in a wireless communication device in accordance with some embodiments.

FIG. 4 and FIG. 7 illustrate methods (400 and 700) in accordance with the teachings herein for distributing media in an infrastructure-based communication system. FIG. 4 illustrates a method 400 performed at an infrastructure device, and FIG. 7 illustrates a method 700 performed at a wireless communication device. In one embodiment, the infrastructure device comprises a PTT server and a SIP user agent server, and the wireless communication devices also implement PTT technology and comprise a SIP user agent client. It should be realized that methods 400 and/or 700 includes functionality that may be performed in hardware, firmware, software, or a combination thereof and may further be performed at a single hardware device or a combination of hardware devices at multiple devices. Also, one or more steps of methods 400 and 700 can be facilitated by supporting external hardware units.

Figure 5:
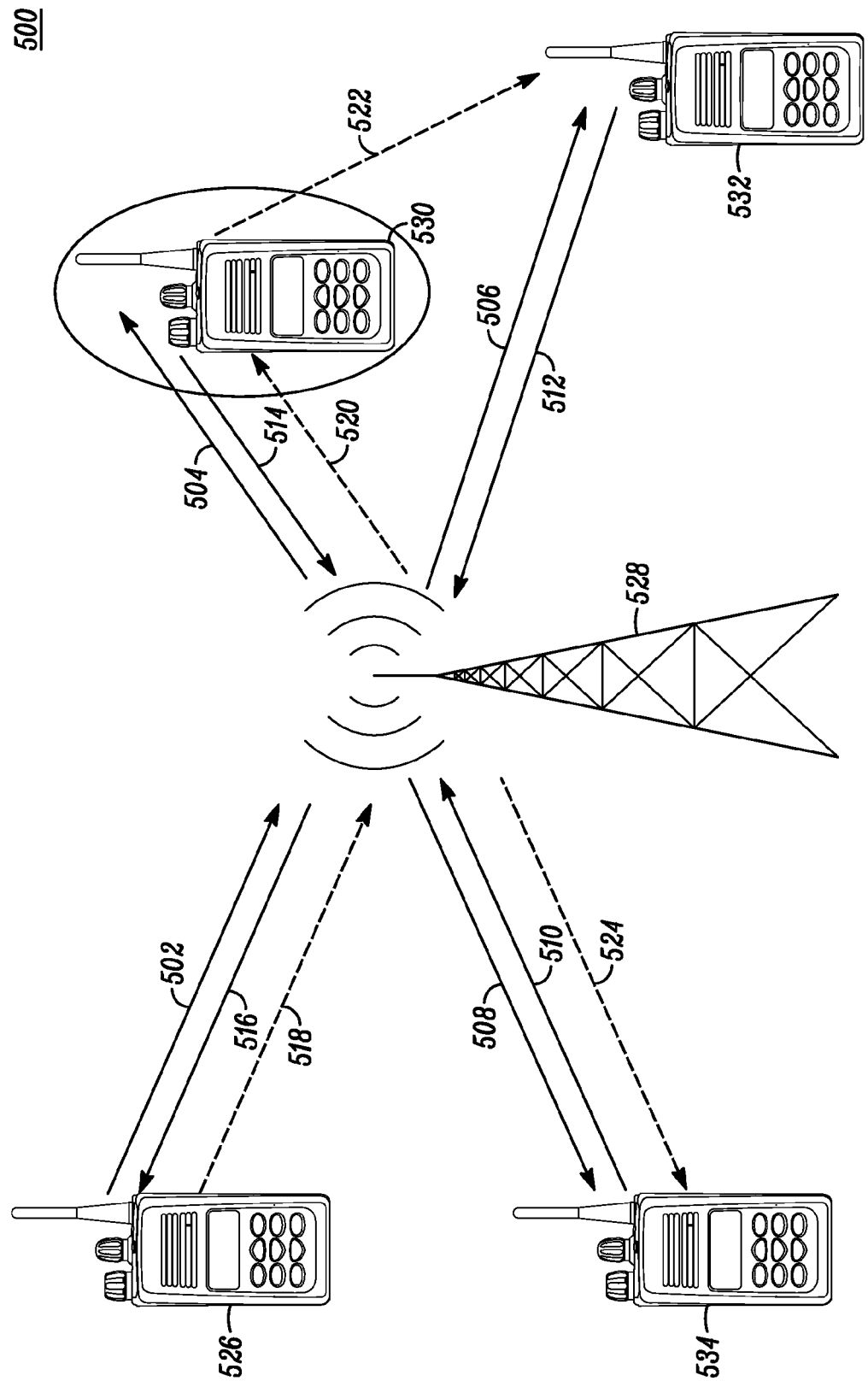
FIG. 5 is a call flow diagram in an infrastructure-based communication system in accordance with some embodiments.

In accordance with methods 400 and 700, a plurality of wireless communication devices acquire membership in or become members of (702) a predefined group, and at least some of these wireless communication devices form (704) one or more ad hoc networks, with each ad hoc network being formed by and between a different subset of the members of the predefined group and with one wireless communication device of each subset being selected as a duplicator node for the corresponding an ad hoc network. A session is then established (402) via the infrastructure device. FIG. 5 illustrates a signaling flow between an infrastructure device 528 and wireless communication devices 526, 530, 532 and 534 (included in a system 500) to establish a session for distributing media to these communication devices. The media can be any form of media as mentioned above. Devices 526, 530, 532 and 534 are all members of the same predefined group. Devices 530 and 532 have formed an ad hoc network associated with the predefined group.

To join (706) the session and in this case initiate the session setup, an originating device (here device 526) sends a SIP INVITE message 502 to the infrastructure device 528, which houses or is otherwise coupled to the controlling PTT server, which manages distribution of media to the predefined group during the session. The SIP INVITE at least identifies the predefined group and serves as an invitation to the other members of the predefined group to start a session. The SIP INVITE in this case is a standard SIP INVITE message. However, if the initiating device were a node of an ad hoc network, the SIP INVITE would be an enhanced SIP INVITE message that identifies the initiating device as a duplicator node. A field in which to include duplicator node ID information is a matter of design choice.

After receiving the SIP INVITE 502, the infrastructure device 528 generates and sends SIP INVITES 504, 506, and 508 to the wireless communication devices 530, 532, and 534, respectively. These SIP INVITEs are sent using standard functionality in accordance with the OMA PoC standard. However, where the message 502 contains a duplicator node ID, the infrastructure device can optionally duplicate and send the messages 504, 506 and 508 without the duplicator node ID information.

The wireless communication devices 530, 532, and 534 on receiving invitations 504, 506, and 508, checks its information store (e.g., a database of associations such as the database 300 shown in FIG. 3) to determine whether it has any associations for this predefined group. If its database of associations contains no associations for the predefined group or if the wireless communication device is a duplicator node, then the wireless communication device continues with the standard OMA PoC session setup procedure and joins (706) the session by sending a standard SIP 200 OK message to the infrastructure device 528. If the wireless communication device finds an associated duplicator node ID in its database of associations for the predefined group, it skips a resource allocation step (if there is one) and responds to the infrastructure device 528 with an enhanced 200 OK message (or other applicable response message) to join (706) the session, which identifies the duplicator node for the ad hoc network to which the device is also a node. In the illustrative implementation shown in FIG. 5, device 532 responds with an enhanced 200 OK message 512 that includes the duplicator node ID for device 530, and devices 530 and 534 respond with standard 200 OK messages 514 and 510, respectively. To complete the session setup, infrastructure device 528 sends a 200 OK message 516 to the initiating device 526. Now the wireless communication devices can commence participating (706) in the session to exchange media.

Based on the 200 OK messages 510, 512 and 514 (and the initial invitation message when applicable), the infrastructure device 528 identifies (404) the duplicator node for each ad hoc network associated with the predefined group and each member of the predefined group that is not a node of any ad hoc network and directly distributes (406) any media to only these devices. The other members of the predefined group are provided the media by the duplicator node for the ad hoc network of which they are a node. So in this illustrative implementation, the devices to which the infrastructure device 528 distributes media are those devices that have sent in a standard SIP signaling message. Accordingly, in the implementation illustrated in FIG. 5, when device 526 sources media to the session participants, it sends (518) the media to the infrastructure device 528, which directly sends the media to only devices 530 (via a transmission 520) and device 534 (via a transmission 524). Device 530 then sends the media (via a transmission 522) to device 532.

To assist the infrastructure devices in managing identities of devices to which they should distribute media for a currently active group session for a given predefined group, these devices store information that they can readily access. Such information can be stored in any suitable storage device either integrated within the housing of the device (e.g., a Random Access Memory) or in a separate physical device to which the infrastructure device has access. Moreover, such information may be maintained in any number of forms such as, but not limited to, a database of associations.

FIG. 6 illustrates a database 600 maintained at an infrastructure device in accordance with some embodiments. The database maintains an association between the predefined groups and members of the predefined group that would receive media for a session. The database includes a predefined group identifier field 602, a wireless communication device identifier field 604, a duplicator node identifier field 606, and a transmit data identifier field 608. The predefined group identifier field 602 indicates one or more predefined groups (e.g., 1004) associated with the infrastructure device. The wireless communication device identifier field 604 identifies the wireless communication devices (e.g., 348, 350, 352, and 354) that are members of a given predefined group. The duplicator node identifier field 606 identifies the duplicator node (e.g., 348) for the ad-hoc networks that are present. The transmit data field 608 identifies the wireless communication devices (illustrated by a "Y" indication in field 608) that would receive media for the session directly from the infrastructure device. The "N" indication in field 608 identifies those wireless communication devices in the predefined group to which the infrastructure device does not send the media.

Turning again to the method 700 performed in the wireless communication devices, when the wireless communication device receives (708) a media transmission during an active session, it can check its data store (e.g., database 300) to determine (710) whether it is a duplicator node. If it is not a duplicator node, the media transmission stops (714) at the wireless communication device. Otherwise the wireless communication device as a duplicator node distributes (712) the media to the other nodes of its ad hoc network.

Additional embodiments may be employed in accordance with the teachings herein. For example, if a wireless communication device changes its associated duplicator node during an active group session, it is not required to notify the infrastructure device (managing the media transmissions) because it will receive the media from the new duplicator node. However, the wireless communication device could instead be configured to send the ID for the new duplicator node in an update message to the infrastructure device.

In another embodiment, instead of or in addition to the infrastructure device receiving the identities of the duplicator nodes in the session setup signaling, the infrastructure device could maintain knowledge of a multicast group used to distribute media to the duplicator nodes. Each duplicator node would join the multicast group upon being selected as a duplicator node and would leave the multicast group when it no longer serves as the duplicator node. Accordingly, the infrastructure device would directly send the media during a session for a predefined group to a multicast address corresponding to the multicast group of duplicator nodes and to members of the predefined group that are not nodes of any ad hoc network.

In yet another embodiment, a duplicator node can notify the infrastructure device of the number of nodes for which it serves as a duplicator, which can be used to establish resource priority. The duplicator node could also notify the infrastructure device of a resource priority level or a change in resource priority level based on a change in the number of nodes that it serves. These embodiments may be implemented while the duplicator node is idle, during session setup (e.g., using signaling described above by reference to FIG. 5), during an active session or at periodic points in time depending on system requirements (where the information is sent to the infrastructure device using any suitable communication technique). Moreover, the infrastructure device can receive a notification of a change in the number of ad hoc networks, the identity of nodes or number of nodes in the ad hoc network, and/or the duplicator node of one or more ad hoc networks. This information can be received during session setup, during an active session or at periodic points in time. At least some of the updated information that the infrastructure device receives may trigger the device to update its database of associations (e.g., FIG. 6) or resource allocation priorities accordingly.

In the foregoing specification, specific embodiments have been described. However, one of ordinary skill in the art appreciates that various modifications and changes can be made without departing from the scope of the invention as set forth in the claims below. For example, the order of the signaling within each flow diagram does not necessarily denote order and timing of the signaling unless specifically indicated.

Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for media distribution in an infrastructure-based communication system, the method comprising: establishing, by a first infrastructure device, a session for a predefined group having as members a plurality of wireless communication devices where distribution of media within the predefined group is managed by the first infrastructure device, wherein the first predefined group has associated therewith at least one ad hoc network, with each ad hoc network being formed by and between a different subset of the members of the predefined group, with one wireless communication device of each subset being selected as a duplicator node for the corresponding ad hoc network; identifying, by the first infrastructure device, the duplicator node for each ad hoc network and each member of the predefined group that is not a member of any of the ad hoc networks; and distributing, by the first infrastructure device, media for the session to only the members of the predefined group that are not a node of any of the ad hoc networks and to the duplicator nodes for distributing to the remaining members of the predefined group that have joined the session wherein at least one of the members of the predefined group receives the media directly from one of the duplicator nodes via the first infrastructure device, wherein the one of the duplicator nodes receives the media directly from the first infrastructure device, and wherein the at least one of the members of the predefined group does not maintain an uplink channel with the first infrastructure device.

2. The method of claim 1 further comprising receiving, by the first infrastructure device, a notification of a change over time in at least one of:
   the number of ad hoc networks;
   nodes of one or more of the ad hoc networks; or
   the duplicator node for one or more of the ad hoc networks.

3. The method of claim 1 further comprising:
   receiving, by the first infrastructure device, from a first member of the predefined group that was not a node of any of the at least one ad hoc networks, the identity of the duplicator node for one of the ad hoc networks; and
   discontinuing, directly distributing the media from the first infrastructure device, to the first member.

4. The method of claim 1 further comprising:
   receiving, by the first infrastructure device, an indication from a first member of the predefined group that the first member is no longer a node of the at least one ad hoc network; and
   directly distributing the media from the first infrastructure device, to the first member.

* * * * *